United States Patent
Bannai et al.

(10) Patent No.: US 7,130,832 B2
(45) Date of Patent: Oct. 31, 2006

(54) ENERGY SERVICE BUSINESS METHOD AND SYSTEM

(75) Inventors: Masaaki Bannai, Shonan (JP); Junichi Chiba, Matsudo (JP); Kenichi Kuwabara, Abiko (JP); Sadakazu Kamo, Ushiku (JP)

(73) Assignee: Hitachi, Ltd., Tokyo (JP)

( * ) Notice: Subject to any disclaimer, the term of this patent is extended or adjusted under 35 U.S.C. 154(b) by 283 days.

(21) Appl. No.: 09/843,736

(22) Filed: Apr. 30, 2001

(65) Prior Publication Data

US 2002/0007388 A1    Jan. 17, 2002

(30) Foreign Application Priority Data

Jul. 14, 2000  (JP)  .............. 2000-214142

(51) Int. Cl.
*G06F 17/00* (2006.01)
*G06F 9/44* (2006.01)

(52) U.S. Cl. .......................... 705/412; 705/7

(58) Field of Classification Search ........... 705/1, 705/7, 8, 10, 11, 26, 400, 412, 29, 413, 63; 340/870.01, 870.02, 310.01, 870.05, 870.06, 340/870.03; 379/106.03, 111; 700/291, 700/286, 295; 702/61, 62
See application file for complete search history.

(56) References Cited

U.S. PATENT DOCUMENTS

| | | | | |
|---|---|---|---|---|
| 4,399,510 A | * | 8/1983 | Hicks | 705/412 |
| 5,566,084 A | * | 10/1996 | Cmar | 705/412 |
| 5,758,331 A | * | 5/1998 | Johnson | 705/412 |
| 5,762,265 A | * | 6/1998 | Kitamura et al. | 236/51 |
| 5,924,486 A | * | 7/1999 | Ehlers et al. | 165/238 |
| 5,962,989 A | * | 10/1999 | Baker | 315/294 |
| 6,105,000 A | * | 8/2000 | Hickman et al. | 705/412 |
| 6,169,979 B1 | * | 1/2001 | Johnson | 705/412 |
| 6,216,956 B1 | * | 4/2001 | Ehlers et al. | 236/47 |
| 6,324,860 B1 | * | 12/2001 | Maeda et al. | 62/271 |
| 6,424,871 B1 | | 7/2002 | Nakajima et al. | |
| 6,535,859 B1 | * | 3/2003 | Yablonowski et al. | 705/412 |
| 6,772,052 B1 | * | 8/2004 | Amundsen et al. | 700/291 |
| 6,785,592 B1 | * | 8/2004 | Smith et al. | 700/291 |

FOREIGN PATENT DOCUMENTS

| | | | |
|---|---|---|---|
| GB | 2093615 | * | 9/1982 |
| WO | 01/06612 | | 1/2001 |

OTHER PUBLICATIONS

"Hitachi Hyoron", vol. 82, No. 6, pp. 40-52, also attached is an English translation of relevant parts A to D marked parts of the documents.
International Performance Measurement & Verification Protocol, Updated Version of 1996 North American Energy Measurement and Verification Protocol; Dec. 1997; p. 1-188.

(Continued)

*Primary Examiner*—Igor N. Borissov
(74) *Attorney, Agent, or Firm*—Antonelli, Terry, Stout and Kraus, LLP.

(57) ABSTRACT

If the energy service enterprise is responsible for paying costs for applying energy-saving measures to the object facilities, measures the energy consumption after taking the energy-saving measures, calculates the amount of curtailed energy cost by comparing the measured value with the energy consumption before taking the energy-saving measures previously stored in the database, and receives at least a part of the curtailed amount, the customer is not required to plan equipment investment in energy-saving measures and collection thereof. Introduction of the energy-saving measures is thus made easier.

19 Claims, 12 Drawing Sheets

OTHER PUBLICATIONS

Showcase Demonstration Case Study, "The Challenge: Optimizing Electric Motor Systems at a Corporate Campus Facility", A program of the U.S. Department of Energy, pp. 1-6.

EPA, Energy Star Building Manual, Financing Your Energy Efficiency Upgrade, p. 1-10.

Energy Matters, Office of Industrial Technologies, Mar. 1999, pp. 3-7.

"Introduction of ESCO (an Energy Service Company) Service", by The Energy Conversation Center of Japan in Feb. 1997 Cover, Data Brochure No. 1.

"Report by Study Group for Introduction of ESCO Service", by The Energy Conversation Center of Japan in Mar. 1998 Cover, Data Brochure No. 2.

* cited by examiner

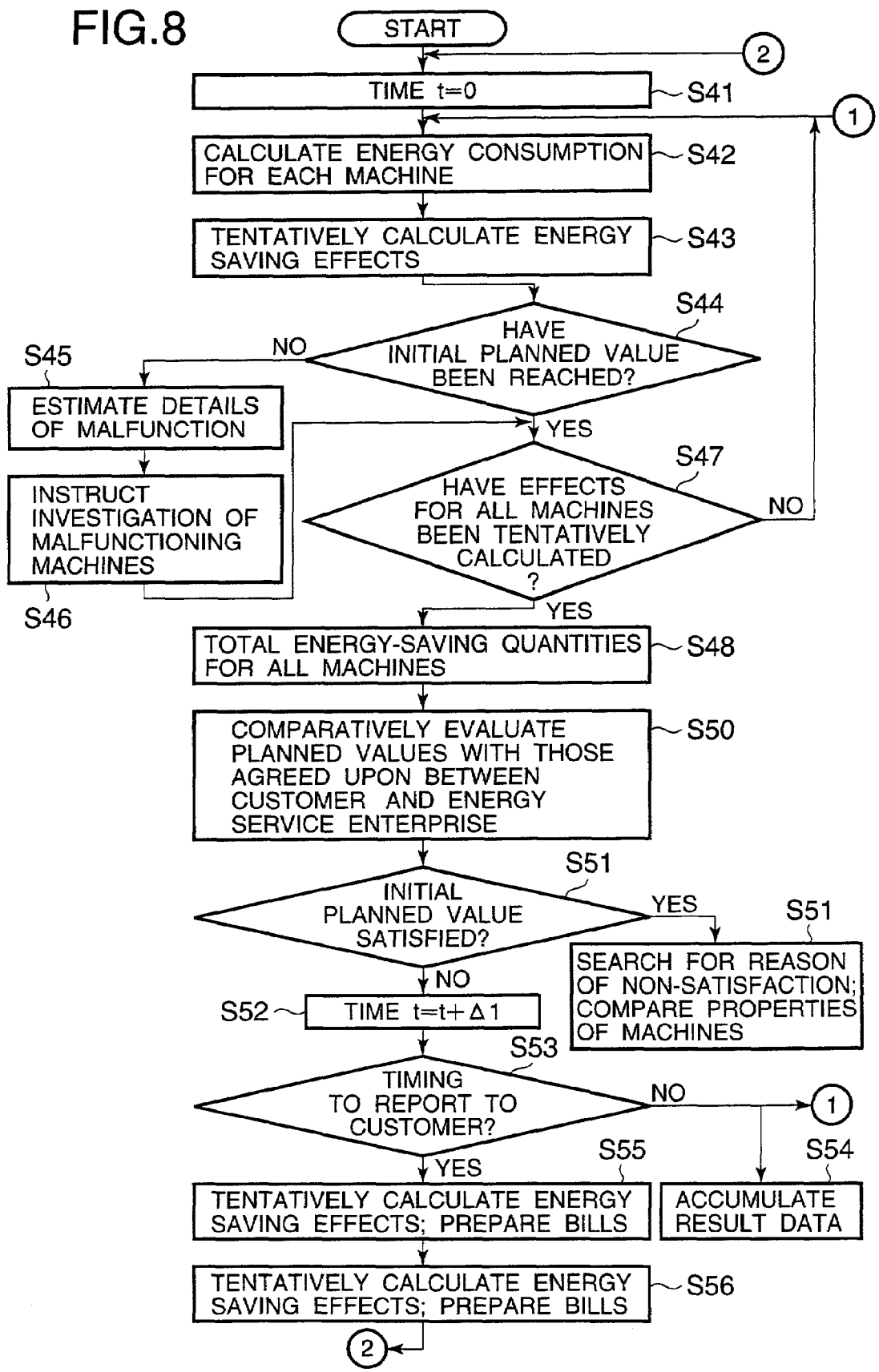

ENERGY SERVICE BUSINESS METHOD AND SYSTEM

BACKGROUND OF THE INVENTION

1. Field of the Invention

The present invention relates to energy service business method and system.

2. Description of the Related Art

There is an increasing interest in the world in global warming and environmental preservation, and efforts for improvement are internationally made. For example, it is demanded to take energy-saving measures to business enterprises of plants and buildings, major energy consumers, to determine energy-saving target values, and achieve such target values within a certain period of time.

Research and development efforts of energy-saving techniques are made in various fields under these circumstances, including, for example, research and development of energy-saving equipment and facilities for curtailing the energy consumption, and energy-saving measures based on specific operating method or controlling method of energy-saving object facilities. In this specification, all these energy-saving equipments, energy-saving facilities, energy-saving operation and control will be called generically energy-saving facilities or measures.

In general, business enterprises demand to collect the investment cost for taking energy-saving measures by means of an energy cost capable of being curtailed through energy conservation. In addition, if the investment cost can be collected within the shortest possible period of time, it would largely promote energy-saving measures.

However, while a reference of about three years is generally believed to be desirable for collection of invested funds to be examined when an enterprise makes an equipment investment, achievement of a high energy conservation target value would require five to six years for collecting the invested funds. If the amount of curtailment of energy costs through energy conservation is smaller than initially expected, furthermore, investment collection would require more years, resulting in a problem of difficulty to adopt measures for achieving a high energy-saving target value.

SUMMARY OF THE INVENTION

Accordingly, it is an object of the present invention to make it easier to apply energy-saving measures.

To solve the above-mentioned problems, the invention permits easier introduction of energy-saving measures by creating the following energy service businesses.

A first form of management is characterized in that the investment cost for energy-saving measure is derived from contribution of funds by energy service enterprises and energy conservation effect, i.e., curtailment of the energy costs. More specifically, the process comprises the steps of applying energy-saving measures to object facilities at the cost of an energy service enterprise, measuring the energy consumption after taking energy-saving measures, and calculating the amount of curtailment of the energy costs by comparing the thus measured value with the energy consumption before taking the energy-saving measures previously stored in a database, and allowing the energy service enterprise to receive at least a part of the amount of curtailment. According to this form of management, the customer, not required to make an equipment investment for taking energy-saving measures and plan collection thereof, is easier to introduce energy-saving measures. As a result, introduction of energy-saving measures is encouraged, and inhibition of global warming and preservation of environments are promoted.

In this case, it is desirable to store the energy consumption before taking energy-saving measures, together with attribute data of variable factors of the energy consumption, in the database, measuring the energy consumption after taking the energy-saving measures, together with the attribute data, and compare the measured value with the energy consumption before taking the energy-saving measures corresponding to the measured attribute data. The attribute data is characterized by being at least one of temperature, humidity and load quantity of the object equipment. It is desirable to retrieve a plurality of past data corresponding to a plurality of attribute data approximating the measured attribute data, perform calculation for estimating past data corresponding to the measured attribute data from the plurality of past data, and compare the measured data with the calculated past estimated data.

The amount received by the energy service enterprise should preferably be determined with reference to the operating hours or the operating rate of the object equipment. When the quantity of energy curtailment is under a predetermined reference value, the energy service enterprise provides maintenance or improvement without compensation of the equipment to which the energy saving is applied so as to satisfy the reference value.

More specifically, the amount received by the energy service enterprise is, when the total amount of the fixed costs such as depreciation and tax and tariffs for a single fiscal year for taking energy-saving measures and the variable costs such as maintenance cost of energy-saving equipment is Q, the annual amount of curtailment of energy costs is P, and $\alpha$ and $\beta$ are positive coefficients (where $\alpha > \beta$):

X1% of curtailment amount of energy cost when $P \geq \alpha Q$;

X2% of curtailment amount of energy costs when $\beta Q \leq P < \alpha Q$ (where, X1<X2); and a predetermined amount when $P < \beta Q$.

X2 is calculable by the following formula:

$$X2 = X1 + (\alpha - P/Q)(100 - X1)/(\alpha - \beta).$$

In this case, the amount collected by the energy service enterprise is determinable on the basis of the operating hours or the operating rate of the energy-saving object equipment or the energy-saving equipment. The energy service enterprise can receive an amount of collection in response to an amount of energy cost curtailment calculated periodically (every three months, for example).

When the quantity of energy curtailment is smaller than an assured value, the energy service enterprise performs maintenance of the energy-saving equipment or improvement thereof so as to satisfy the assured value.

The customer and the energy service enterprise may share the installation cost of the energy-saving equipment to install the same. In this case, the energy service enterprise receives an amount calculated by distributing the amount of energy cost curtailment in accordance with the share thereof.

A second form of management of the invention is characterized in that the energy service enterprise drafts a plan and executes energy-saving measures and assures an energy-saving effect, i.e., an amount of energy cost curtailment, irrespective of whether or not the energy service enterprise contributes investment funds for the energy-saving measures. More specifically, this process comprises the steps of drafting energy-saving measures by the energy service enterprise or a related organization thereof; assuring, under certain conditions, a quantity of curtailment of energy consumption available when taking energy-saving measures in accordance with the thus drafted measures; measuring the energy consumption after taking the energy-saving measures; calculating the amount of curtailment of energy costs by comparing the thus measured value with the energy consumption before taking the energy-saving measures previously stored in a database, and periodically confirming the assured quantity of curtailment.

This enables a general business enterprise to introduce energy-saving facilities free from care. The certain conditions are conditions determined as to variable factors having an important effect on curtailment of the energy consumption such as the operating rate or operating hours, operating conditions (production quantity, frequency of batch processing, etc.) of the energy-saving object equipment. The certain conditions can have ranges. Weather conditions (temperature, humidity) which have an important effect on the energy-saving, can be coped with by using past data obtained under the same conditions. If past data under the same conditions are unavailable, approximate data are used through interpolation or extrapolation.

When the quantity of curtailment is under the assured value, the energy service enterprise should preferably perform maintenance of the energy-saving equipment or improvement thereof so as to satisfy the assured value. In this case, it is desirable that the energy service enterprise can receive a compensation in an amount corresponding to the quantity of energy curtailment in excess of the assured value in reward for assuring a quantity of energy curtailment, or as a cost to be appropriated for maintenance and improvement.

The method of business as described above can be achieved by adopting a system comprising a database which stores past data about the energy consumption before taking energy-saving measures; measuring means which measures the energy consumption after taking energy-saving measures; and calculating means which calculates the energy curtailment quantities before and after taking energy-saving measures by incorporating measurement data measured by the measuring means via a communication line and comparing the measurement data and the past data stored in the database.

In this case the past data in the database are stored together with attribute data regarding variable factors of the energy consumption. The attribute data represents at least one of temperature, humidity and load quantity of an energy-saving object equipment.

The calculating means calculates the amount of curtailment of the energy costs on the basis of the energy curtailment quantity, and issues a bill demanding payment of an amount obtained by multiplying the amount of curtailment by a predetermined ratio.

Other objects and advantages of the present invention will become apparent from the following description made with reference to the attached drawings.

BRIEF DESCRIPTION OF THE DRAWINGS

FIG. 8 is a flowchart illustrating contents and procedure of management control of the energy-saving equipment in the flow shown in FIG. 1;

DESCRIPTION OF THE PREFERRED EMBODIMENTS

Figure 1:
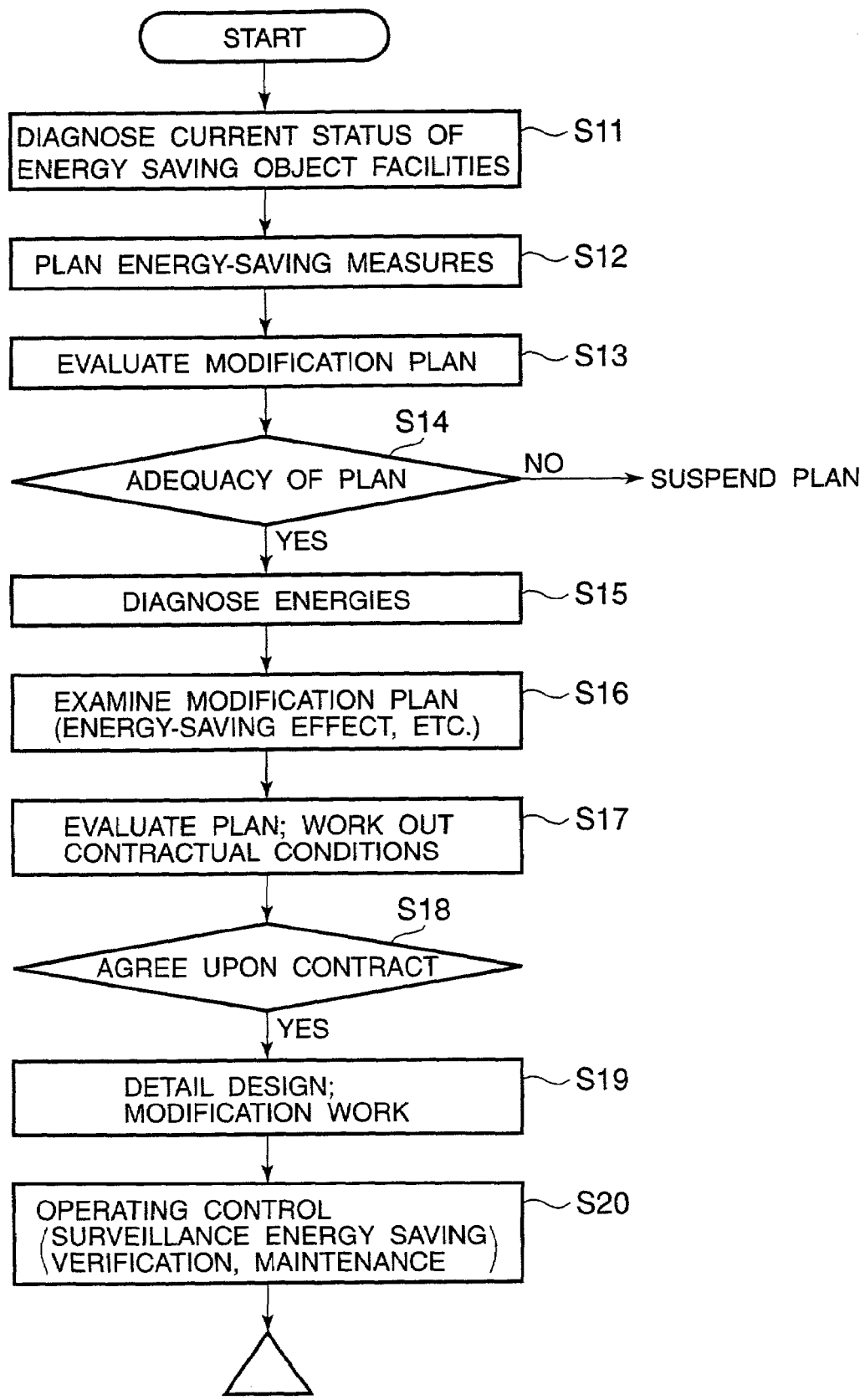
FIG. 1 illustrates a flowchart of energy-saving measures of an embodiment of the energy service business method of the present invention.

Embodiments of the energy service business including a method of management of an energy service business of the present invention will now be described. FIG. 1 illustrates an embodiment of flowchart of the energy-saving measures in an energy service business method.

(Step S11)

The work of energy-saving measures begins with, upon customer's request, investigation of the current status of energy-saving object facilities and diagnosis as to energy conservation. Energy-saving object facilities include, all types of equipment, facilities, machines, and apparatuses consuming energy such as various production facilities, utility facilities (such as electric power, gas, heat, air and water), general buildings (such as office buildings, hospitals and public facilities). Energies consumed, in addition to electric power, gases, and heat (cold and warm), include utilities such as water, air and the like.

Investigation of the current status of energy-saving object facilities (hereinafter simply referred to as "object facilities") covers timing of introduction of object facilities, status of facilities such as operating hours or number of days, and energy consumption.

(Step S12)

Then, a plan of energy-saving measures is drafted. First, a basic plan of energy-saving measures by setting basic conditions for the installation space for the energy-saving facilities, amount of investment, electric power under contract, number of years of depreciation, impact on environments, and future expansion plan. Electric power under contract is set because the power unit price varies with the electric power under contract. The energy-saving measures include replacement of existing facilities by energy-saving type new facilities, addition of energy-saving facilities, proposal of maintenance for energy conservation, and proposal of management and control of facilities for energy saving.

(Step S13)

Then, for a draft modification plan, the operating cost, equipment cost, maintenance expenses and personnel cost are tentatively calculated. Simultaneously, the curtailment effect of $CO_2$ by energy saving is tentatively calculated to approximately evaluate validity of the modification plan. That is, the increase in various costs required for introduction of energy-saving facilities and the cost curtailment effect of energy conservation are macroscopically and comparatively examined, and the validity of the basic modification plan is assessed regarding the presence of troubles caused by introduction of the energy-saving facilities.

(Step S14)

When the plan is assessed not to be valid, the plan is discontinued, and when it is assessed to be valid, the following detailed planning is conducted.

(Step S15)

In this step, the current energy consumptions are measured for the object facilities, and detailed energy diagnosis is performed. This diagnosis gives past data used when calculating the energy-saving effect, as described later. The energy consumptions of the object facilities vary with the load such as the production quantity of the object facilities, operating hours or operating rate, weather conditions (temperature, humidity), season, and day or night. Therefore, in order to calculate the energy-saving effect by comparing energy consumptions before and after modification, it is necessary to collect energy consumption data for the individual object facilities before modification to be compared, together with attribute data such as load on the object facilities, temperature and humidity, for the longest possible period of time, and prepare a database of past data before modification.

(Step S16)

A concrete energy-saving measures are planned on the basis of the database prepared in step S15. A method of energy-saving measures comprises the steps, for example, of investigating the pattern of daily power consumption or heat energy consumption for the object equipment, and when the daytime power consumption is very small as compared with the night one, storing electric energy in the night in an ice heat accumulating system, an accumulator, or a power storage equipment, releasing the same in the daytime, and balancing the power between day and time, thereby curtailing the power cost. It is necessary to examine introduction of energy-saving facilities generating electric power and heat by burning a fuel such as oil or gas such as a composite generator (co-generator). Furthermore, the driving motor of a pump or a fan is converted into inverter control, and energy conservation is achieved by controlling the number of revolutions of the motor in response to a load thereof. Various often energy-saving measures are proposed.

After thus planning concrete energy-saving measures, the curtailment effort of the energy consumption is tentatively calculated for the care when these energy-saving measures are taken. In this case, the effect thereof on environments is taken into account, and at the same time, labor saving and achievement of a higher efficiency are accomplished for the control of the energy facilities.

(Step S17)

As a result of examination of modification plan, evaluation is conducted as to whether of not the available energy-saving effect is sufficient to permit collection of the investment cost required for modification of facilities. Details of this evaluation will be described later. In summary, the evaluation criterion is whether or not the investment funds for the energy-saving measures can be collected within an appropriate number of years (for example, within ten years at the latest). When an evaluation that the amount of investment can be collected within an appropriate number of years is obtained, the customer and the energy service enterprise consider entering into a contract specifying that number of years as the years under contract and the customer shall pay a part of the curtailed amount of energy cost under the energy-saving effect to the energy service enterprise.

Figure 2:
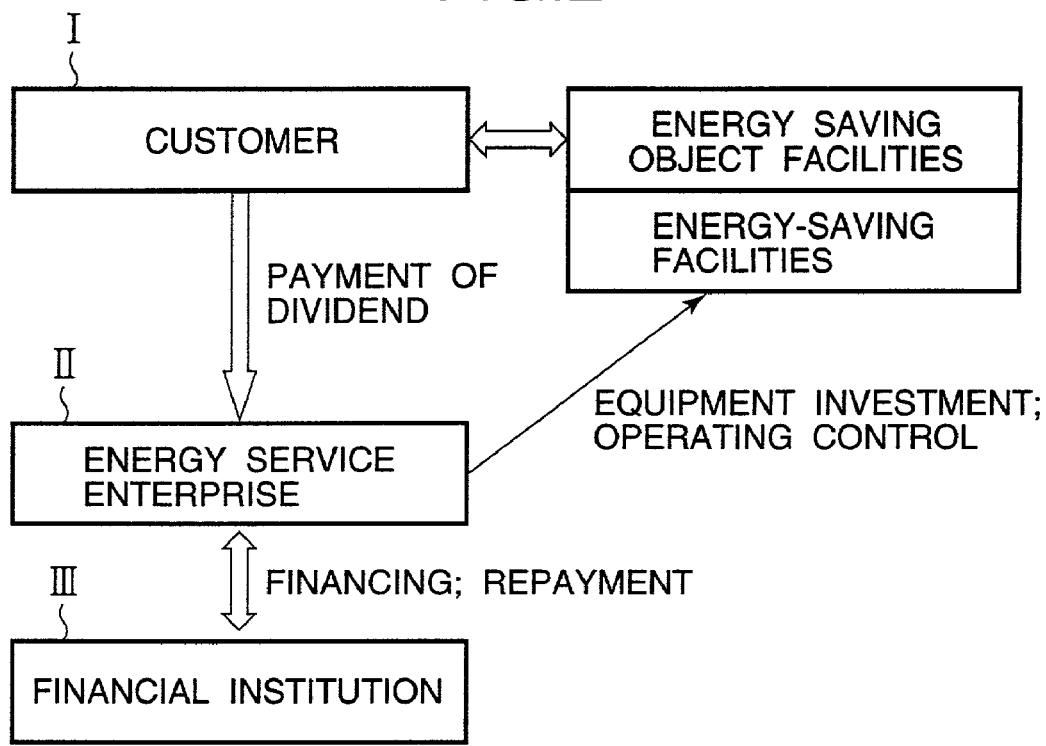
FIG. 2 is a conceptual view illustrating a form of contract of the energy service business method of the invention.
Figure 3:
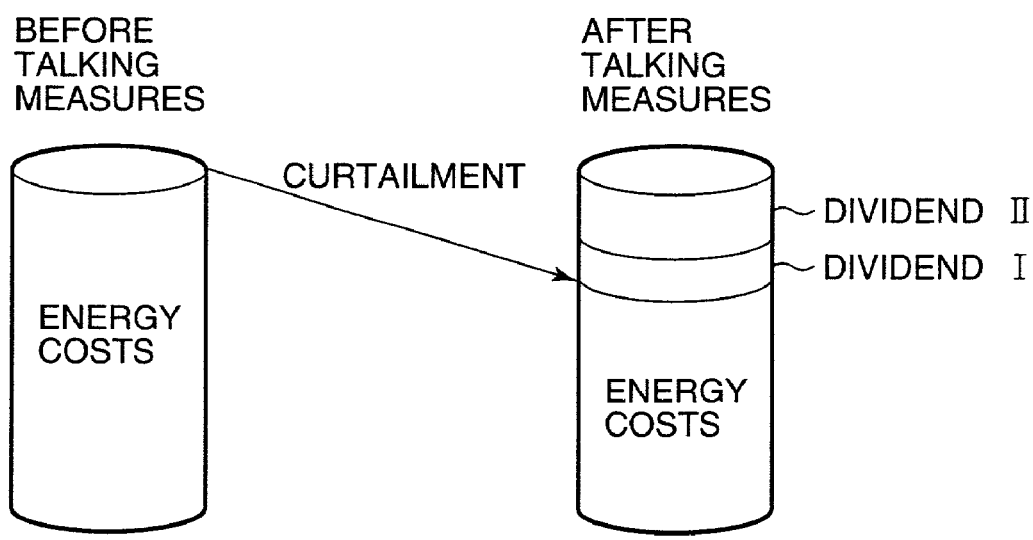
FIG. 3 illustrates the concept of allocation of profit under the energy-saving effect in the energy service business method of the invention.

In this embodiment, a contract form as shown in the conceptual view illustrated in FIG. 2 is adopted. As shown in FIG. 2, the investment cost required for energy-saving measures applied to the energy-saving object facilities of the customer I, i.e., the modification cost including the installation cost of the energy-saving equipment is borne by the energy service enterprise II. The energy service enterprise III is financed by a financial institution III with investment funds as required. The energy-saving enterprise III enters with the customer I into a contract for sharing the amount of curtailed energy cost achieved under the energy-saving effect a certain ratio with the customer. A concrete example of the distribution contract will be described later. As shown in the conceptual view of FIG. 3, the customer I and the energy service enterprise II share the amount of curtailment of the energy cost after taking the measures from the energy cost before taking the measures. The energy service enterprise thus carries out business with the dividend paid by the customer as income. More particularly, the energy service enterprise carries out business by appropriating the dividend income for repayment of the loan financed by the financial institution III, and on the other hand, for management and control (verification, maintenance and improvement) of the energy-saving facilities. The distribution ratio of dividend may be determined on the basis of the operating hours or operating rate of the energy-saving facilities. Since the energy-saving effect largely varies with the operating rate among others, the contract should preferably set forth that the distribution ratio for the energy service enterprise II shall be reduced when the operating rate is high. A concrete example of distribution will be described later.

(Step S18)

When the both parties agree upon the contractual terms and conditions, a contract for implementation and management of energy-saving measures in entered into.

(Step S19)

The energy service enterprise or a related organization thereof conducts a detailed design of the energy-saving measures under the contract, and executes the work including installation of energy-saving equipments and modification of existing facilities.

(Step S20)

After implementation of the energy-saving measures, the energy service enterprise carries out management and control of services for the energy-saving measures including surveillance of the energy-saving equipment, verification of the energy-saving effects, maintenance and improvement. More specifically, the energy consumption after taking energy-saving measures, and voltage, current, flow rate of fuel, flow rate of a fluid such as coolant and temperature necessary for calculating the energy consumption are periodically (for example, every 15 minutes or every hour) measured, and recorded as measured data. Attribute data such as load on the object facilities, temperature and humidity are measured in parallel with this, and recorded together with the measured data including the energy consumption.

The quantity of energy curtailment is calculated by comparing the same or substantially the same measured with past data previously stored in the database. If there is not found the same substantially the same data, approximation is performed through interpolation or extrapolation. The amount of curtailed energy cost is calculated on the basis of the thus calculated quantity of curtailed energy and the energy unit price set forth in the contract. Dividend is calculated periodically (for example, monthly, every three to 12 months), on the basis of this amount of curtailment. The energy-saving effect is reported to the customer, and payment of the dividend is demanded.

When the quantity of energy curtailment is under a predetermined reference value of an assured value, on the contrary, the energy service enterprise provides maintenance or improvement of the energy-saving equipment without compensation so as to satisfy the reference value. Control is performed so as to satisfy the assured value or the reference value of the quantity of curtailed energy by appropriately monitoring the data recorded through measurement of the energy consumption after taking the energy-saving measures, determining whether or not the energy-saving equipment displays, determining performance, and applying maintenance or the like as required.

Figure 4:
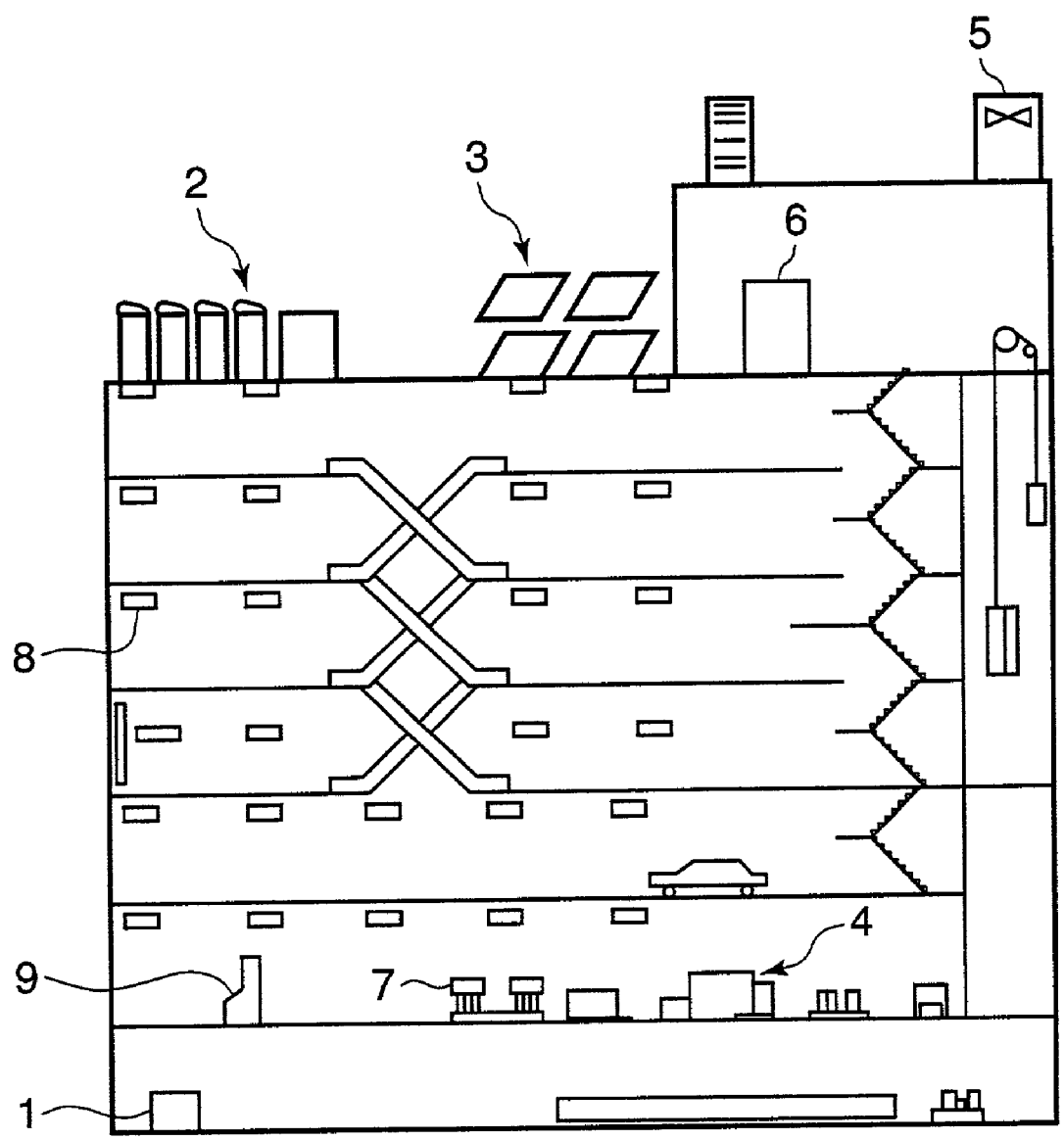
FIG. 4 is a descriptive view of an example explaining energy-saving object facilities and an energy-saving equipment.

Main portions in the flowchart of FIG. 1 will now described in detail. FIG. 4 illustrates a concrete example of energy-saving measures to be examined in step S12 or S16 shown FIG. 1. The object facilities shown in FIG. 4 represent the case of research institute. In view of the basic fact that energy consumption is considerably smaller than that in daytime, the following energy-saving measures are examined.

a. Electric Power Storage Facilities 1:

Power charges are reduced by storing night electric power of a lower rate, and releasing the same at the daytime peak of power consumption, thus leveling the power consumptions. In general, reducing the contract power reduces the power unit price.

b. Ice Heat Accumulating System 2:

This serves as a cooling source of air conditioning and other facilities. Power charges can be reduced by manufacturing ice by use of night electric power, and utilizing the low temperature of ice for air conditioning during daytime, thus reducing the daytime power consumption through leveling of the power consumptions.

c. Solar Generation Facilities 3:

The power consumption can be leveled between night and daytime by generating power from sun light during the daytime.

d. Composite Generating System (Co-Generator) 4:

Power consumptions are leveled between night and daytime by generating power through driving of a prime mover such as an engine by a gas or oil fuel, and on the other hand, waste heat of prime mover is used for air conditioning and hot water supply. Particularly, use of a dispersion type composite generating system permits improvement of energy efficiency and reduction of driving noise.

e. Cooling Source (Cooling Tower) 5:

The capacity of pumps for cooling water and cold water can be reduced and the power consumption is curtailed by improving the cooling efficiency of the cooling tower and increasing the temperature difference between entry and exit of cooling water and cold water.

f. Motor Inverter Control 6:

Power saving can be achieved by changing control of driving motors for air conditioner fans and cold water pumps into inverter control, and reducing the number of revolutions in response to the air conditioning load.

g. Power Receiving and Transforming Equipment 7:

Power consumption can be reduced by reducing loss (no-load loss, load loss) of the power receiving and transforming machines such as transformers.

h. Energy-Saving Illuminating Appliances 8:

Power consumption is saved by operating fluorescent lumps with a high-frequency inverter. Contrivances are made in lighting so as to use sunlight during daytime. Illuminance is improved by pasting a high-reflectivity film to the reflector.

i. Management Control of Energy Conservation 9:

The operating status of the facilities and the energy consumption is monitored, and improvement is examined for facilities showing water of energy or a poor efficiency, if any.

j. Other Measures:

Processed water discharged from a water treatment equipment 10 is reused as so-called intermediate water, thereby effectively utilizing water resources. Efforts are made also to reduce the quantity of dust and waste.

Figure 5:
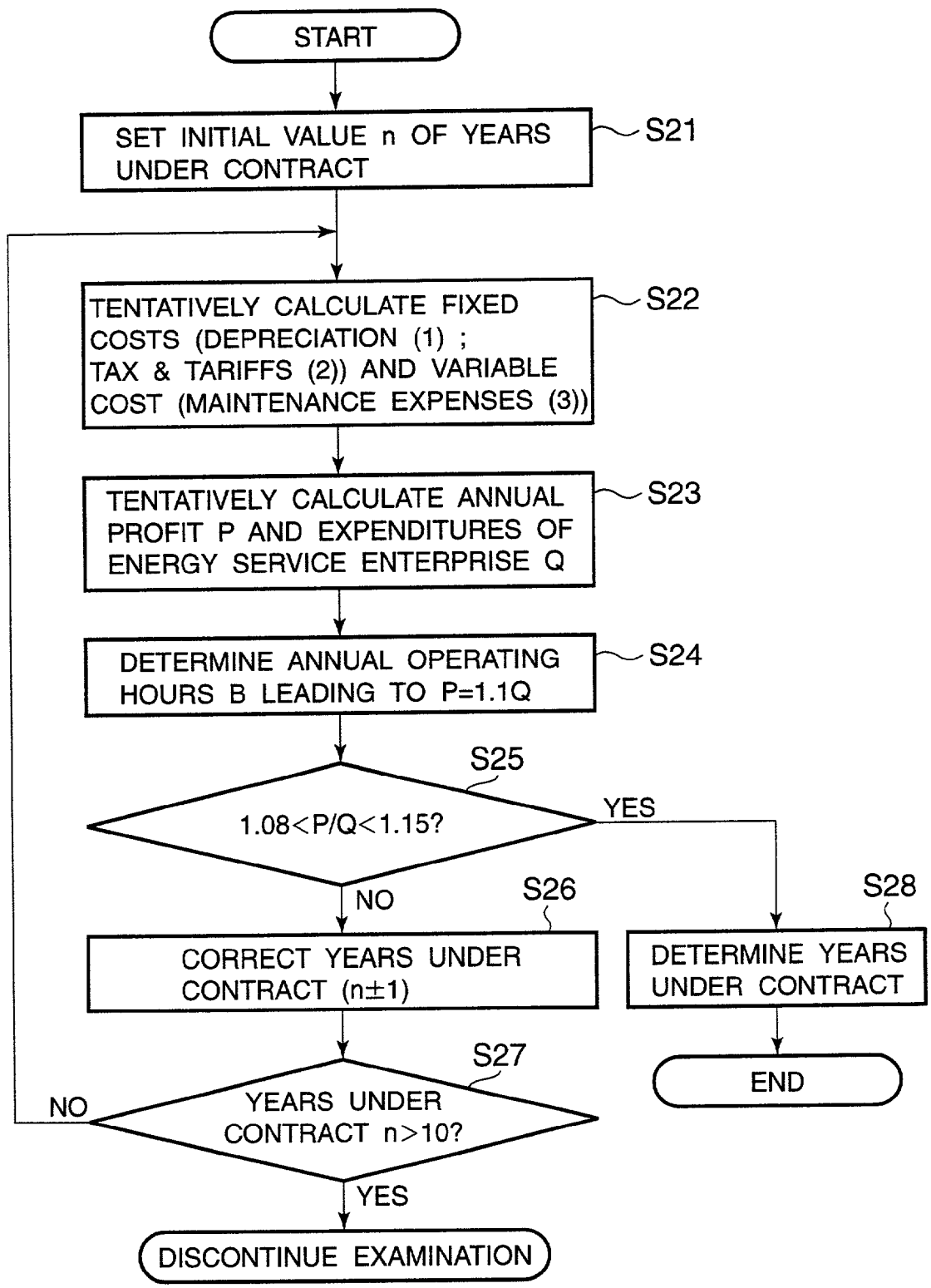
FIG. 5 is a flowchart illustrating a detailed procedure for evaluation of the flow shown in FIG. 1 and setting of years under contract.
Figure 6:
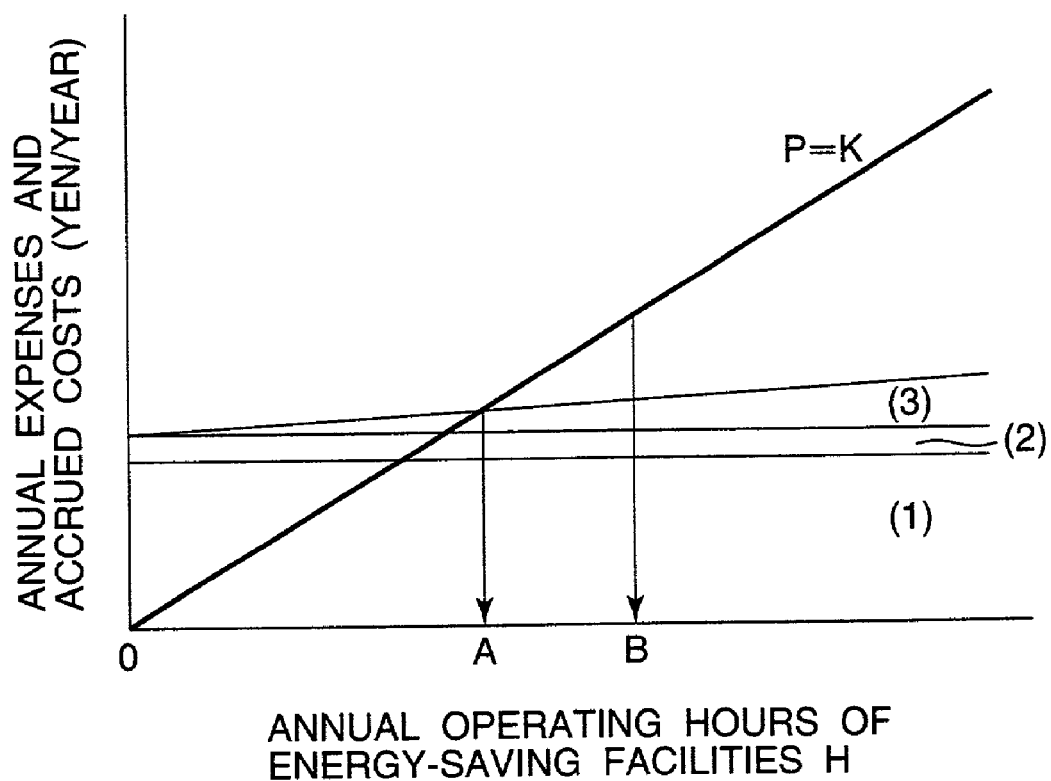
FIG. 6 is a diagram explaining the relationship between the annual operating hours and annual expenses/accrued costs of an energy-saving equipment.
Figure 7:
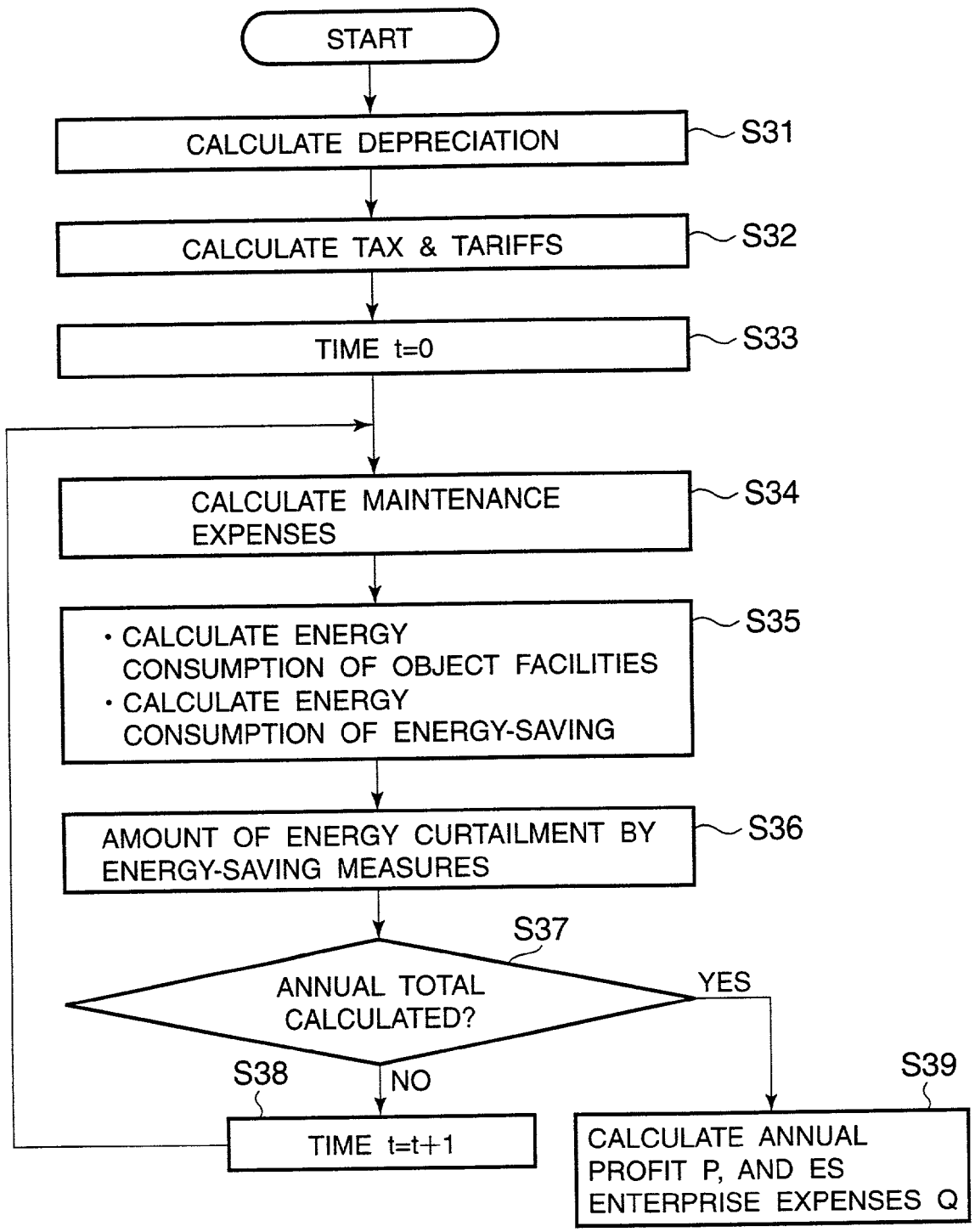
FIG. 7 is a flowchart illustrating the calculating procedure of the annual profit of the flow shown in FIG. 1 and expenses of the energy service enterprise.

The procedure for assessing a plan and setting a number of years under contract in step 17 shown in FIG. 1 will now be described with reference to FIGS. 5 to 7.

(Step S21 and S22)

The initial value n of contract years is set (S21), and various costs for evaluating the energy-saving are calculated (S21). More particularly, the investment cost for energy-saving measures is collected with a number of years n under contract. For example, the depreciation cost and the fixed costs comprising tax and tariffs such as fixed asset tax, insurance premium and other general expenses and tentatively calculated for each fiscal year (single fiscal, year). The variable costs comprising maintenance cost necessary for maintaining the performance of the energy-saving equipment are also tentatively calculated. On the other hand, the amounts of curtailed energy cost K=aH before and after taking the energy-saving measures are tentatively calculated for the energy-saving object facilities. The amount of curtailment is calculable by multiplying the quantities of curtailed energy before and after taking the energy-saving measure by an energy unit price: a represents an amount of curtailed energy cost per unit operating time (curtailment coefficient); and H, annual operating hours of the object equipment. The mount of curtailment K increases according as the annual operating hours of the energy-saving equipment H is longer. The relationship between the annual cost/accrued costs and the annual operating hours is as shown in FIG. 6.

(Step S23)

When the energy service enterprise contributes the investment cost for the energy-saving measures, and holds the equipments installed or modified for such measures, the depreciation cost (1) and expenses including tax and tariffs (2) would borne by the energy service enterprise. The maintenance cost (3) for assuming the energy-saving effect is also at the cost of the energy service enterprise. Accordingly, in step S23, the amount of curtailed energy (energy-saving effect) P available from the energy-saving measures and the annual total expense Q for the energy service enterprise an tentatively calculated in accordance with the following formula:

$$P = \text{Amount of curtailed energy } K$$

$$Q = \text{Depreciation (1)} + \text{expenses (2)} + \text{maintenance (3)}$$

(Step S24)

If the energy-saving effect P surpasses the annual total expense Q, which means that the energy-saving measures pay, P=Q would be the break-even-point. In order to obtain a profit as a business, P>Q is preferable, and the number of contract years necessary for collection of investment funds is required to be up to ten years, or preferably five to six years. Because the amount of energy curtailment increases with the annual operating hours H, the number of contract years n can be reduced according as the annual operating hours H increase. The appropriateness of the number of contract years n is therefore determined using as a standard the annual number of operating hours B when P=1.1Q.

(Step S25)

It is determined whether of not the ratio of P to Q determined in Step S23 satisfies the range of the following formula:

$$1.08 < P/Q < 1.15$$

If this formula is not satisfied, the process advances to step S26.

(Step S26 and S27)

If P/Q is under the above-mentioned range, the contract number of years n is extended for another one year (S26), and returning to step S22 via step S27, and the aforementioned processing is executed again. When repetition leads to the number of contract years of over ten years, the examination is discontinued (step S27).

(Step S28)

If P/Q is within the above-mentioned range in the determination in step S25 as a result of repetition of processing, the number of contract years N is determined in step S28.

The details of steps S22 and S23 will now be described with reference to the flow shown in FIG. 7.

(Step S31)

The depreciation cost (1) for each fiscal year is calculated on the assumption that the costs for the energy-saving measures are to be depreciated in the number of contract years. Necessary data in this calculation include the personnel cost, materials cost, processing cost and the increment ratios thereof, which are on stored in the database.

(Step S32)

Calculation of the tax and tariff expenses (2) such as fixed asset tax in executed. Data necessary for this calculation include fixed asset tax, and excise, which are stored in the database.

(Step S33)

Time t from among the calculation parameters is reset to t=0.

(Step S34)

The maintenance cost (3) is calculated in step S34. That is, costs required for maintenance, inspection and modification necessary for assuring or keeping the energy-saving effect. Data necessary for this calculation include personnel cost, materials cost, processing cost and increment ratios thereof, which are stored in the database.

(Step S35)

The energy consumption for the object facilities and the energy consumption for management of the energy-saving equipment. Data necessary for this calculation include:

(1) Weather conditions (temperature, humidity);
(2) Load (plant, general building, etc.) operation or operating conditions (for example, production quantity, batch processing frequency, etc.);
(3) Past operating data of facilities and equipments (for example, data in the form of energy characteristics curves of partial load, as derived from operating data for a past few years);
(4) Characteristics data of facilities and equipments (motor efficiency curve, machine performance curve, characteristics of rotary machines such as refrigerator, pump, fan and compressor, characteristics of prime mover, etc.);
(5) Operating data (annual operating days, daily operating hours).

(Step S36)

The amount of curtailment which represents the energy-saving effect after taking the energy-saving measures is calculated on the basis of the energy consumptions calculated in step S35. The amount of curtailment in this case can be calculated in units of a month, or three to 12 months. Data necessary for this calculation include charge data of electricity, gas, oil and water and tax data such as excise, which are stored in the database.

(Step S37 and S38)

In step S37, it is determined whether or not the energy-saving effects of step S36 have been added up for a full year. If not, one hour is added to t in step S38, and returning to step S34, the process is repeated.

(Step S39)

Depending upon the determination made in step S37, the annual project (energy-saving effect) p and the expenses Q for the energy service enterprise are calculated on the basis of the amounts of curtailed energy K before and after taking the energy-saving measures, and the process domes to an end.

FIG. 8 illustrates contents and procedure of management control after startup of operation of the energy-saving equipment upon the completion of detailed design and modification work of the energy-saving measures under the contract (S18) entered into upon agreement between the customer and the energy service enterprise, as represented in the concrete flow of step S20 shown in FIG. 1.

(Step S41)

In the flow of FIG. 8, the process is executed at intervals of a certain period of time (Δt: for example, every 15 minutes or every hour): preparation and submission of a report to the customer as an end, the time counter t is reset to 0, and repetition is started.

(Step S42)

Energy-saving calculation is executed for each machine. A remote information control server executing the process of FIG. 8 is provided, for example, on the energy service provide side. Therefore, measured data necessary for calculating the energy conservation for each machine are measured via a monitor provided on the energy-saving object facilities and the energy-saving equipments, collected by a data collecting and transmitting unit, and transferred to the remote information control server.

The measured data include, in addition to quantities of energy consumed electric power and fuel quantities such as gas and oil for each equipment, physical quantities such as temperature, heat and flow rate regarding the energy consumption. Machines include a motor, a pump, a fan, an air compressor, a compressive refrigerator, a suction type refrigerator, and a co-generator (composite generator) and other prime movers.

Together with the measured data, load data having an effect on the energy consumption such a temperature, humidity and production quantity are measured as attribute data and collected and transferred. The measured data including the thus transferred attribute data are once stored, for example, in a working memory of the remote information control server of a database. Energy consumptions of the individual machines are calculated on the basis of the measured data thus stored in the database.

(Step S43)

For the energy consumption or the measured data for the individual machines calculated in step S42, the past energy consumptions or past data of the corresponding machine are retrieved from the database, and the energy-saving effect, i.e., the quantity of energy curtailment is tentatively calculated by comparing these data.

(Step S44)

Data are compared so as to see whether or not the energy-saving effect calculated in step S43 reaches the quantity of initially planned effect. If the planned value is not reached by the energy-saving effect, the process proceeds to steps S45 and S46, and when it is reached, the process goes to step S47.

(Steps S45 and S46)

When the energy-saving effect does not reach the planned value, details of malfunction of the machine is estimated on the basis of the measured data, and a check instruction of the corresponding malfunctioning machine is issued, returning to step S47.

(Step S47)

In this step, it is determined for all the machines whether or not the energy-saving effect has been calculated. If not, the process returns to step S42, and the process of tentatively calculating the energy-saving effect for each machine is repeated. Upon the completion of tentative calculation of the energy-saving effect for all the machines, the process advances to step S48.

(Step S48)

The quantities of energy saving, i.e., the energy-saving effects for all the machines are added up in this step S48 to calculate the quantity of energy curtailment resulting from the energy-saving measures.

(Step S49)

In this step, the planned value of the quantity of energy curtailment agreed upon between the energy service enterprise and the customer is compared for evaluation with the quantity of energy curtailment calculated in step S48.

(Steps S50, S51 and S52)

If the initially planned value is not satisfied, the reason of non-satisfaction is retrieved in step S51. For example, examination is made by, for example, comparing characteristics of the corresponding machines with the initially planned characteristics. If it is satisfied, n the other hand, the process proceeds to step S52, and the time counter is put forward by Δt.

(Step S53)

In this step, it is determined whether or not it is a report timing to the customer as set forth in the contract (for example, a month, three months, six months and a year). If not the report timing, the calculated result is stored as result data in the database, returning to step S 42 to repeat the process. It is a report timing, the process advances to step S55.

(Step S55)

First, a bill is prepared on the basis of the result of tentative calculation of the energy-saving effect. As described above, a amount based on a ratio corresponding to the energy-saving effect as get forth under the contract is demanded. An example of determination of this amount will be described on the assumption that the energy service enterprise is responsible for payment of the costs necessary for the energy-saving measures. As described above with reference FIG. 6, if the total amount of the fixed costs such as the depreciation (1) for a single fiscal year for the energy-saving measure and the tax and tariffs (2) and the variable costs (3) including the maintenance cost of the energy-saving equipment is Q; the annual amount of curtailed energy cost is P(=K), and α and β are position coefficients (where, α>β), the contract sets forth that the energy service enterprise receives:

X1% of the amount of curtailed energy cost when $P \geq \alpha Q$;

X27% of the amount of curtailed energy cost when $\beta Q \leq P < \alpha Q$ (where X1<X2); and a predetermined amount when $P < \beta Q$.

Figure 9A:
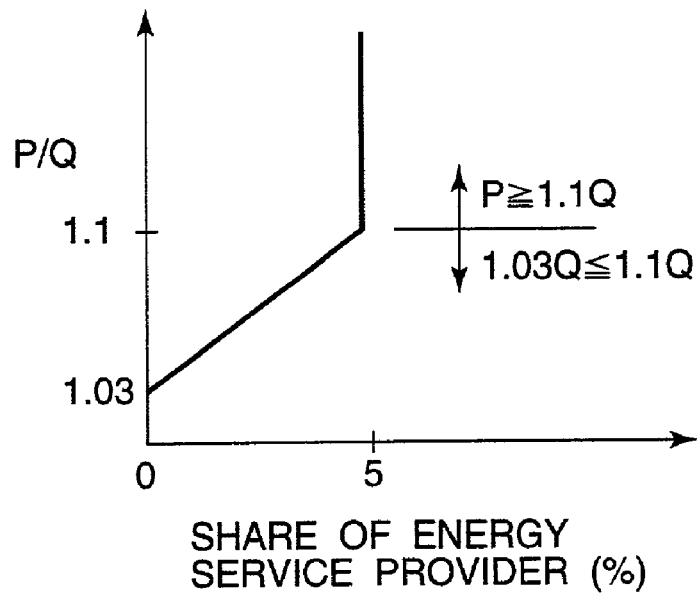
FIG. 9 illustrates (A) and (B), two examples of determination of the sharing ratio of the energy-saving effects.

FIG. 9 (A) illustrates example of shares. A case where $\alpha=1.1$ and $\beta=1.03$ are set will be described. A case where the annual operating rate or operating time is near the break-even-point (P=Q) is represented by $\alpha=1.1$. Setting a reference value or a planned value of the annual operating rate at such a point leads to an increase in the number of contract years, i.e., the number of years required for collecting the costs. This is therefore unrealistic. In the case of an annual operating rate lower than $\alpha=1.1$, on the other hand, the absolute value of the amount of curtailed energy is also smaller. When distributing an amount of curtailed energy cost (annual profit), therefore, an amount over a certain amount of curtailment should be set as a planned value. When $P \geq 1.1Q$, for example, a contract should preferably be entered into by setting forth a share of the energy service enterprise of X=95% and a share of the customer of Y=5%. The share of the energy service enterprise is larger because the enterprise is responsible for paying all the costs for the energy-saving measures, and this forms one of the features of the method of the present invention.

When the annual operating time is smaller than the planned value, which is often caused by circumstances on the customer side, the share of the energy service enterprise should preferably be increased from the point of view of collecting the investment funds. Since a smaller number of annual operating hours exerts a more serious effect such as dispersion of measured data, $\beta=1.03$ should be set forth, and in a case with a smaller β, the share of the energy service enterprise is increased to 100%. Within the range of $1.03Q \leq 1.1Q$, therefore, the share of the energy service enterprise of X2% is gradually increased from 95% to 100% as is suggested by the following formula:

$$X2=X1+(\alpha-P/Q)(100-X1)/(\alpha-\beta)=95+(1.1-P/Q)(100-95)/1.1-1.03)$$

In a case with P<1.03Q, the energy service enterprise receives payment of a certain amount as a minimum guarantee for the necessity to collect the invested funds. This amount should preferably be an amount corresponding to the total of the depreciation (1), the expenses (2) and the maintenance cost (3) as shown in FIG. 6, but it depends upon agreement between the parties.

Figure 9B:
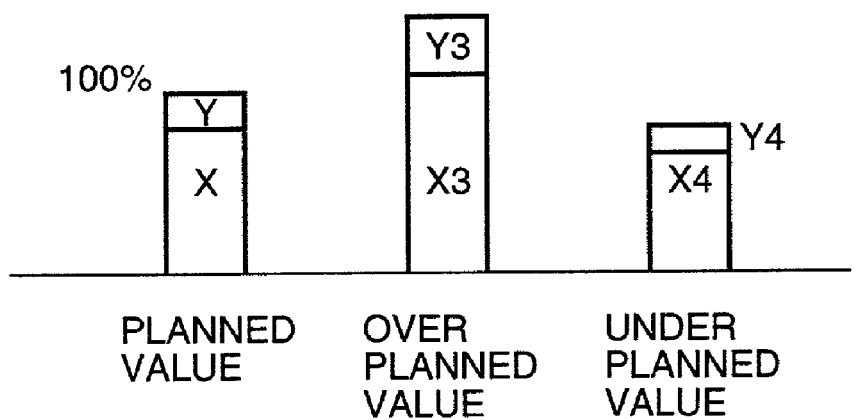

FIG. 9(B) shows another example of distribution. In the example shown, with reference to an assessed amount or an expected amount under contract, if the energy-saving effect is over this value, the share of the energy service enterprise is increased to X3, as compared with the share of X when the effect is equal to the expected value, to serve as a bonus. When the effect is under the contract value, the share of the enterprise may be decreased even to X4 in some cases. When the energy service enterprise has intention to repay an amount Z to the financial institution on the basis of the share X, and the share is increased to X3, the energy service enterprise puts the increment of share Z3 aside provisionally, and when the share becomes X4, on the contrary, manages the business so as to provisionally loan the decrement of share Z4.

(Step S56)

The energy service enterprise prepares a result report of energy conservation and submits the same to the customer together with a bill, the process returning to step S41 to repeat the steps.

Figure 10:
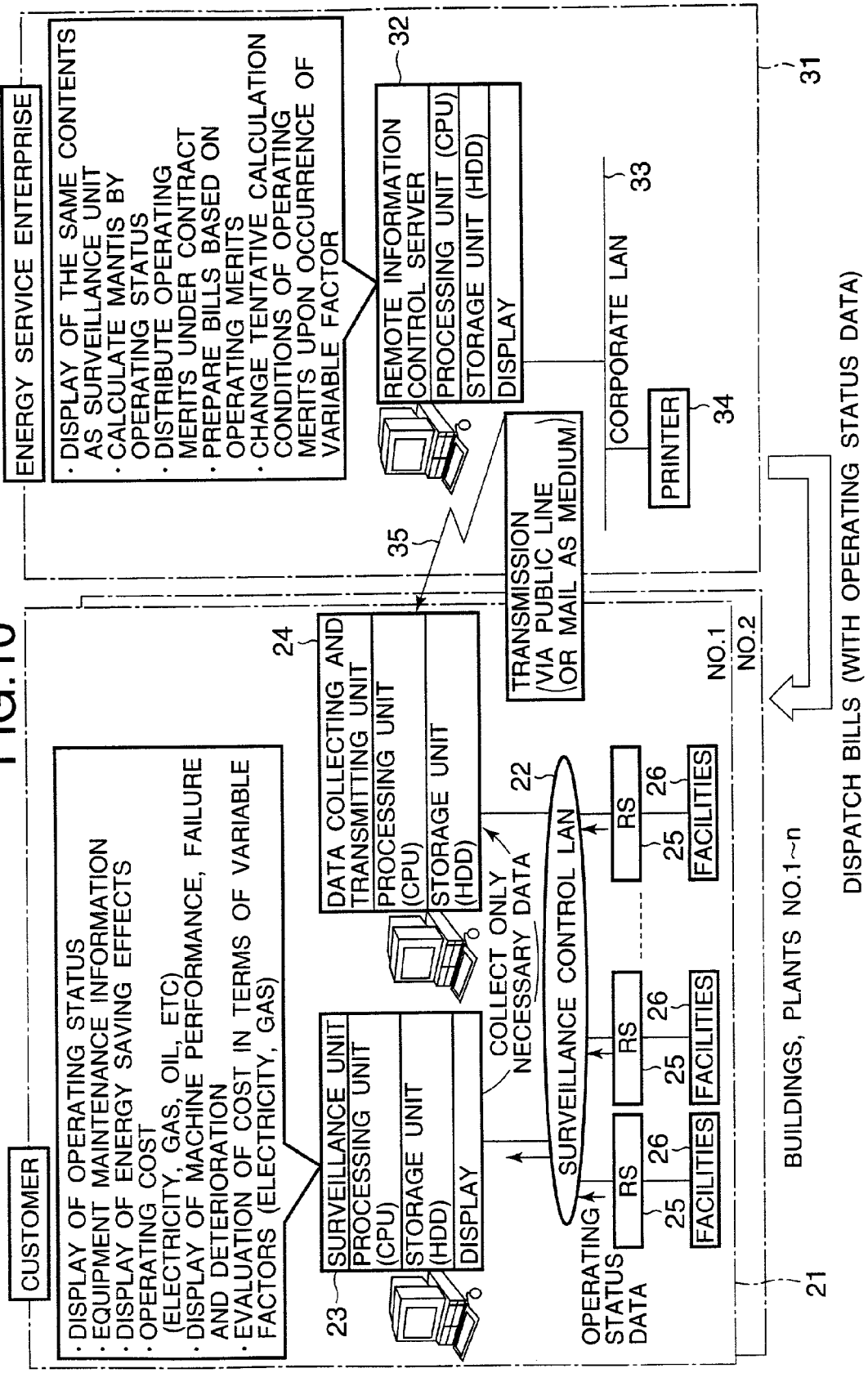
FIG. 10 is a configuration diagram illustrating an embodiment of the management control system of the energy service business method.

FIG. 10 illustrates an embodiment of the management control system of the aforementioned energy service business method. As shown in FIG. 10, the management control system provided in a building or a plant, object facilities of the customer comprise a monitoring control LAN 22, a monitoring unit 23 connected to this monitoring control LAN 22, and a data collecting/transmitting unit 24. A plurality of measuring instruments of the energy-saving equipment 26 are connected to the monitoring control LAN 22 via remote stations 25, respectively. The monitoring unit 23 comprises a processing unit (CPU), a storage unit (HDD), and a display unit. The data collecting/transmitting unit 24 comprises a processing unit (CPU) and a storage unit (HDD).

In the management control system on the customer side having the above-mentioned configuration, the monitoring unit 23 incorporates measured data such as temperature, heat and flow rate regarding energy consumption, in addition to quantities of energy such as consumed electric power, gas, oil and other fuel of the individual machines issued from the individual energy-saving facilities via the monitoring control LAN 22 and stores the data in the storage unit. In parallel with these measured data, data such as temperature, humidity and load such as production quantity exerting an effect on the energy consumption are incorporated as attribute data. The display unit of the monitoring unit can display the operating status, equipment maintenance information, energy-saving effect, operating costs (electricity, gas, oil, etc.), machine performance and failure, deterioration, and cost assessment from variable factors (electricity and gas).

The management control system 31 on the energy service enterprise side comprises a remote information control server 32, a corporate LAN 33 connected to this remote information control server 32, and a printer 34 connected to this corporate LAN 33. The remote information control server 32 is connected to the data collecting/transmitting unit 24 on the customer side via a communication transfer line 35 so as to permit communications. The communication transfer line 35 can operate by use of a public line or a mail as a medium. The remote information control server 32 comprises a processing unit (CPU), a storage unit (HDD) and a display unit. The display unit can display the same contents as those on the monitoring unit 23 on the customer side. The remote information control server 32 handles various duties relating to the aforementioned energy service business. For example, calculation of merits depending upon the operating status (energy-saving effect), distribution of operational merits based on the contract, preparation of a bill on the basis of the operational merits, changing conditions for tentative calculation of operational merits upon occurrence of a variable factors, and the like. The bill is sent to the customer via mail, attached with operating status data.

Because of the aforementioned configurations, only necessary data predetermined by the data collecting/transmitting unit 24 from among measured data and attribute data such as temperature and humidity, collected by the monitoring unit 23 and stored in the storage unit are read out and transferred to, and stored in, a database or a working memory composing the storage unit of the remote information control server 32 via the communication transfer line 35. These measured data are transferred periodically (for example, every 15 minutes).

Figure 11:
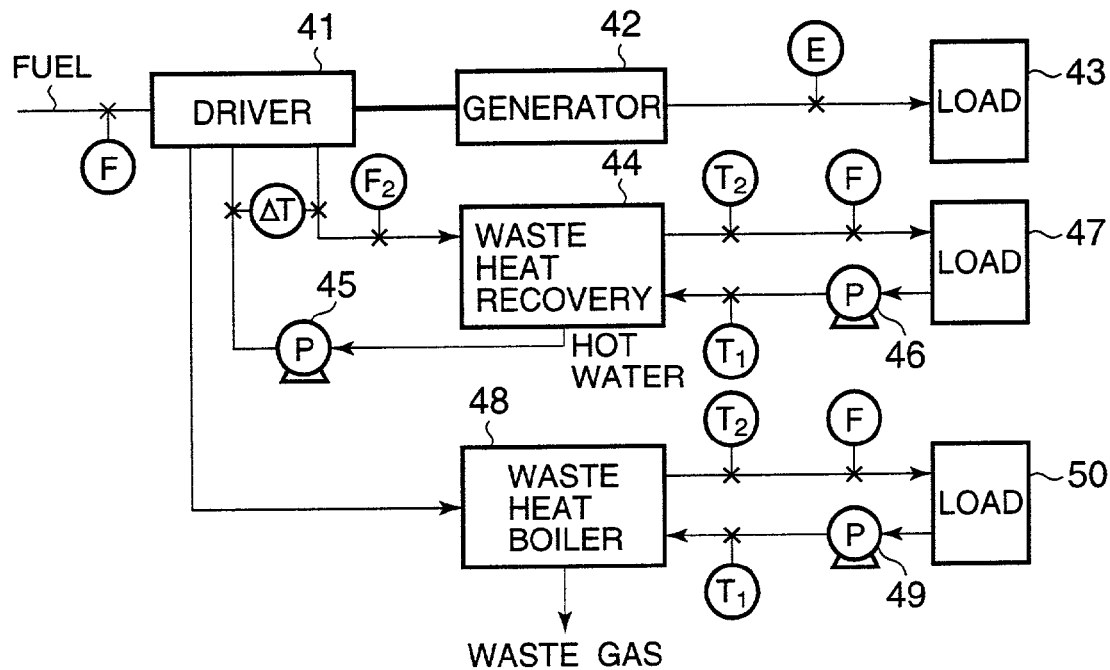
FIG. 11 is a system configuration diagram of an embodiment of a co-generator.

A concrete embodiment of the energy-saving equipment will now be described with reference to FIGS. 11 to 14. FIG. 11 is a system configuration diagram of an embodiment of the co-generator. As shown in FIG. 11, electric power is supplied to a load 43 by driving a generator 42 by means of a prime mover 41 such as a gas turbine. Cooling water is circulated by a pump 45 to the prime mover 41 via a waste heat recovering unit 44 so as to permit collection of heat by the prime mover 41. The heat collected by the waste heat recovering unit 44 is fed to the load 47 by means of a heat medium circulated by a pump 46. Waste gas discharge from the prime mover 1 is directed to a waste heat recovering boiler 48, generates vapor by water fed from a pump 49, and supplies the generated vapor to a load 50. A flowmeter F, an entry thermometer T1, an exit thermometer, a wattmeter, and a temperature difference ΔT meter and other measuring instruments are arranged in each section to monitor the energy status.

Efficiency monitoring of the co-generator having the above-mentioned configuration will now be described. First, input energy takes a value equal to the product of multiplication of the generated heat of the fuel fed to the primer mover 1 HV (kcal/l or kcal/m3) and the measured flow rate Ff (l/h or m3/h). On the other hand, the output energy comprises power generation output and heat output and is determined by multiplying the generation output measured value E (kwH/h) by a heat conversion coefficient 860 (kcal). The heat output is determinable by multiplying the temperature difference between entry and exit (T2−T1) of the waste heat recovering unit 44 and the waste heat recovering boiler 48 by the flow rate F and the specific heat of liquid (kcal/kg ° C.). The generation efficiency ηE, and the heat recovery efficiency ηH are determined by the following formula, where i is 1 or 2, corresponding to the waste heat recovering unit 44 and the waste heat recovering boiler 48:

$$\eta E = E \times 860 / HV \cdot Ff$$

$$\eta H = \Sigma(Fi \times (T2 - T1) \times Ci) / HV \cdot Ff$$

Figure 12:
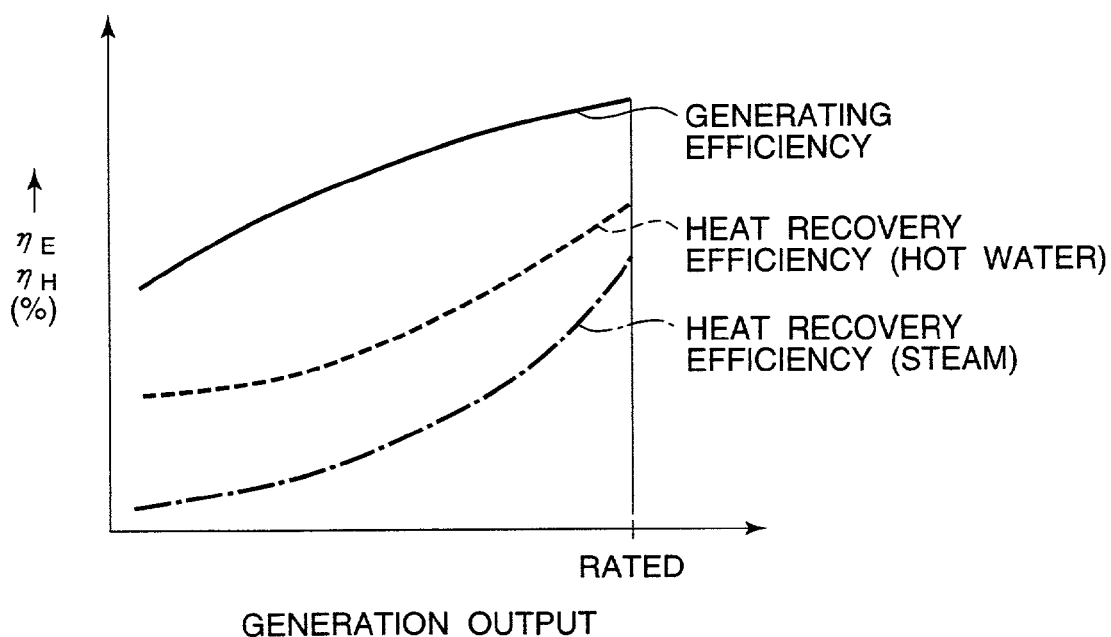
FIG. 12 illustrates generating output and efficiency properties of a co-generator.

For the thus determined generating efficiency ηE and heat recovery efficiency ηH, the efficiency of generating output and characteristic shown in FIG. 12 are periodically compared to determine whether or not appropriate. The characteristic curve shown in FIG. 11 is previously obtained through measurement and stored in the database. It is confirmed whether or not the energy-saving effect is retained as initially planned, by periodically comparing with a current value. An energy-saving effect over the planned value leads to a profit. If it is under the planned value, functions are restored by inspecting the facilities and equipment, and if malfunctions are found, conducting maintenance or repair.

Figure 13:
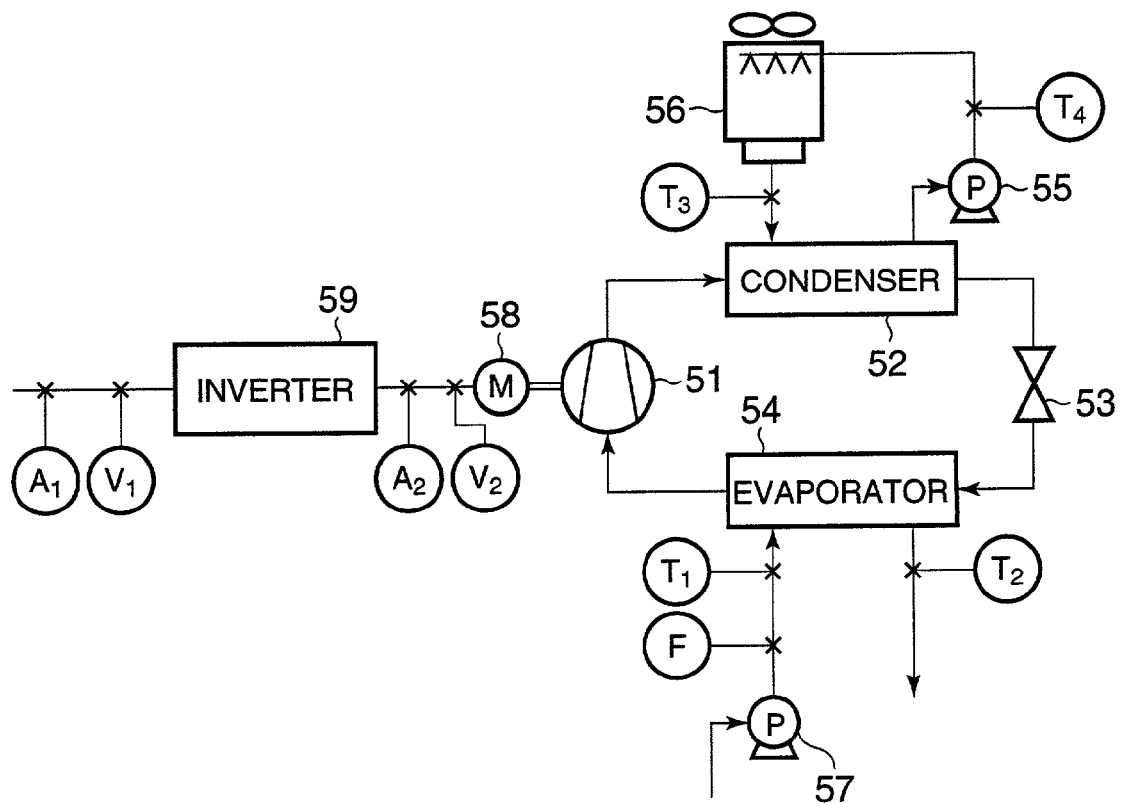
FIG. 13 is a system diagram of a refrigerator based on inverter driving.

FIG. 13 is a system diagram of the refrigerator based on inverter driving. The refrigerator has a coolant cycle comprising the steps of condensing a coolant compressed by a compressor 51 in a condenser 52, sending the condensed coolant to an evaporator 54 via an expansion valve 53, and returning the coolant having released coldness back to the compressor 51. Cold water cooling the condenser 52 is circulated to the coolant 56 via a pump 55. Coolant is circulated to a space between the evaporator 54 and the cooling load by a pump 57. On the other hand, a motor 58 driving the compressor 51 is driven at a variable speed by an inverter unit 59. Ammeters A1 and A2, voltmeters V1 and V2, thermometers T1, T2, T3 and T4 and a flowmeter F are arranged to measure energy at various portions.

Figure 14:
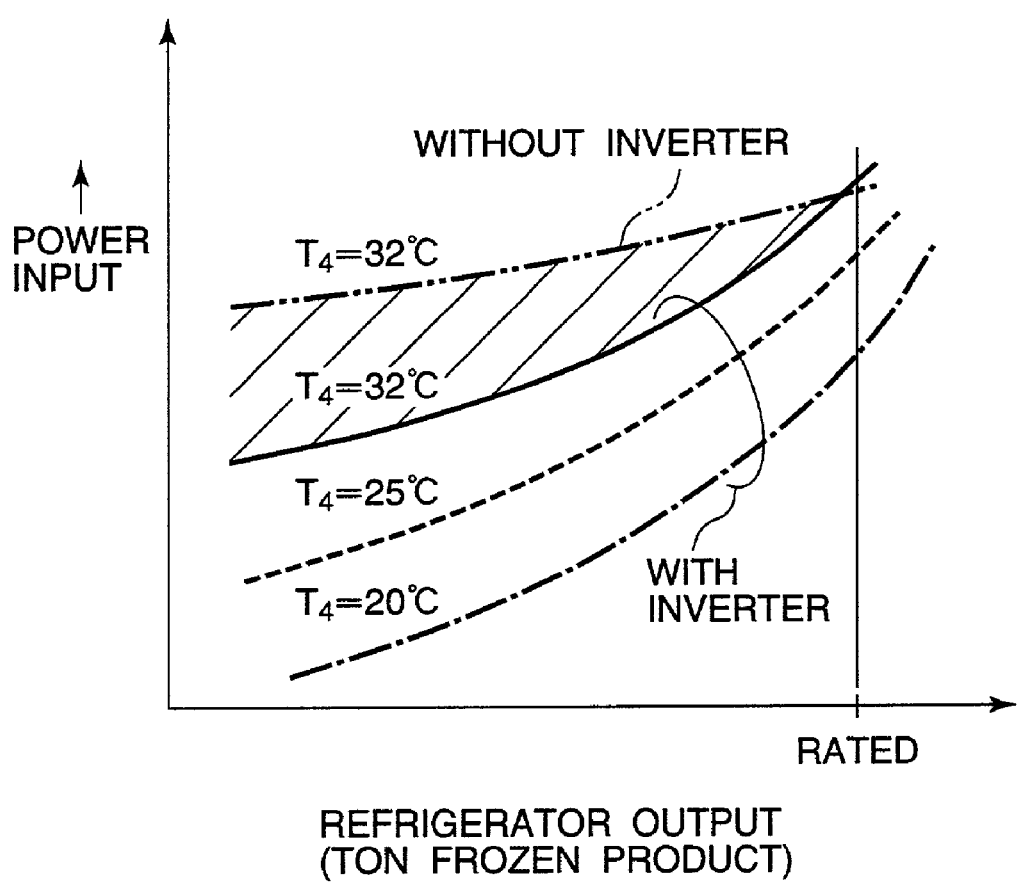
FIG. 14 is a diagram illustrating the relationship between input energy (electric input) and output energy (refrigerator output) of an inverter-driven refrigerator and a refrigerator without inverter.

The characteristic relationship between input energy (electricity input) and output energy (refrigerator output) of the refrigerator based on inverter driving having the above-mentioned configuration is as shown in FIG. 14. A refrigerator using an inverter for motor driving and a refrigerator without inverter are shown in FIG. 14. These data are previously measured and stored in a database or the like. The input energies include inverter-input energy E1 and motor-input energy E2, which can be expressed by the following formula:

$$E1 = A1 \times V1$$

$$E2 = A2 \times V2$$

On the other hand, the flow rate F on the secondary side fluid of the evaporator 54, the temperature difference between entry and exit (T2−T1), and the specific heat can be expressed as follows:

$$H = F \times (T2 - T1) \times C$$

It is confirmed whether or not the initially planned energy-saving effect is maintained by comparing the thus periodically determined current values and the characteristics shown in FIG. 14. An energy-saving effect over the planned value leads to a profit. If under the planned value, the machines are inspected, and when a malfunction is found, recovery of the functions is tried through maintenance or repair. As is evident from FIG. 14, adoption of inverter driving permitted energy curtailment corresponding to the shadowed portion in a case of a cooling water temperature of 32° C. as compared with the case without an inverter.

Similarly, the status of the other energy-saving facilities and equipments is monitored on the basis of the measured data thereof, and if the result is under the planned value, the machines are inspected. If a malfunction is found, recovery of functions is tried through maintenance or repair.

The present invention is not limited to the above-mentioned form of contract, but any other form may be adopted. While a case where the energy service enterprise is responsible for payment of all the costs for energy-saving measures has been described above, the costs may be shared at certain ratios with the customer. The customer may bear all the costs. In these cases, the share of the energy service enterprise should naturally be approximately adjusted.

The contract may take another form of assuring an energy-saving effect on the basis of the plan of energy-saving measures, and receiving payment of a certain amount of money from the customer in compensation for assessment. More specifically, the energy service enterprise or a related organization drafts a plan of energy-saving measures, assures a quantity of energy curtailment, under certain conditions, available when installing energy-saving facilities in accordance with the planned measures, measures the energy consumption after taking the energy-saving measures, determines the difference of the measured value from the energy consumption before taking the energy-saving measures previously stored in the database, and confirms the assured quantity of curtailment periodically. When the assured value is satisfied, the energy service enterprise can receive compensation in a fixed amount or at a fixed rate in response to the amount of curtailed energy cost as a reward for successful achievement. When contributing investment funds, this enables the customer to introduce energy-saving facilities with confidence.

The certain conditions for assurance cover factors which may exert an important influence on the curtailment effect of the energy consumption such as the operating rate or operating hours of the facilities to which the energy-saving measures are applied energy-saving object facilities, and the operating conditions of the energy-saving object facilities (production quantity, batch processing frequency, etc.). The certain conditions may have ranges. Weather conditions (temperature, humidity), which exert an important effect on the energy-saving effect, can be coped with by using past data under the same conditions.

When the quantity of energy curtailment is under the assured value, the energy service enterprise performs maintenance of the energy-saving facilities so as to satisfy the assured value, or improves the energy-saving facilities. In this case, the contract should set forth that the energy service enterprise receives a compensation in response to the quantity of energy curtailment in excess of the assured value.

According to the present invention, as described above, it is possible to easily take energy-saving measures.

What is claimed is:

1. An energy service business system comprising
   a database which stores past data about an energy consumption of at least one of a production facility and a utility facility utilizing cold or warm heat energy before taking energy-saving measures by installing energy-saving equipment;
   measuring means which measures present data of the energy consumption of the at least one of the production and utility facility after taking the energy-saving measures; and
   calculating means which calculates energy curtailment quantities of the at least one of the production and utility facility before and after taking the energy-saving measures by installing the energy-saving equipment;
   wherein said past data in said database are stored in a form correlated with data of temperature and humidity of atmosphere as a variable characteristic of the energy consumption of the at least one of the production and utility facility before taking the energy-saving measures;
   wherein said measuring means measures said present data of the energy consumption of the at least one of the production and utility facility after taking the energy-saving measures together with temperature and humidity data; and
   wherein said calculating means retrieves said past data having temperature and humidity data within a set allowable range corresponding to said measured present data having the temperature and humidity data for the at least one of the production and utility facility, and calculates the energy curtailment quantities by comparing said retrieved past data having temperature and humidity data and said measured present data having the temperature and humidity data.

2. An energy service business system according to claim 1, wherein said calculating means retrieves a plurality of said past data corresponding to a plurality of the temperature and humidity data approximating said measured temperature and humidity data; performing calculation for estimating past data corresponding to said measured temperature and humidity data from said plurality of past data; and calculates the energy curtailment quantities by comparing the thus calculated past estimated data and said measured present data.

3. An energy service business system according to claim 1, wherein said calculating means calculates the amount of curtailment of the energy costs on the basis of said energy curtailment quantity, and issues a bill demanding payment of an amount obtained by multiplying said amount of curtailment by a predetermined ratio.

4. An energy service business system according to claim 3, wherein said ratio is determined with reference to-the operating hours or the operating rate of the at least one of the production and utility facility.

5. An energy service business system according to claim 4, where:
when the total amount of the fixed costs such as depreciation and tax and tariffs for a single fiscal year for taking energy-saving measures and the variable costs such as maintenance cost of energy-saving equipment is Q, the annual amount of curtailment of energy costs is P, and $\alpha$ and $\beta$ are positive coefficients (where $\alpha > \beta$), said energy service enterprise receives:
X1% of the curtailment amount of energy costs when $P \geq \alpha Q$;
X2% of the curtailment amount of energy costs when $\beta Q \leq P < \alpha Q$ (where, X1<X2); and
a predetermined amount when $P < \beta Q$.

6. An energy service business method comprising the steps of measuring and storing in a database energy consumption data of at least one of a production and utility facility utilizing cold or warm heat energy before installation of energy-saving equipment for supplying cold or warm heat energy, together with temperature and humidity data of atmosphere as a variable characteristic of the energy consumption of the at least one of the production and utility facility; installing energy-saving equipment for supplying cold or warm heat energy to the at least one of the production and utility facility with an installation cost thereof paid by an energy service enterprise; measuring data of an energy consumption of the at least one of the production and utility facility after installation of said energy-saving equipment in the at least one of the production and utility facility, together with temperature and humidity data; determining a difference of a resultant measured value from the energy consumption data of the at least one of the production and utility facility before and after installation of said energy-saving equipment; calculating an amount of curtailment of the energy costs on the basis of the thus determined difference by comparing said measured energy consumption data having the temperature and humidity data with the stored energy consumption data before installation of said energy-saving equipment with which said temperature and humidity data agree within a set allowable range; and said energy service enterprise collecting said installation cost from said amount of curtailment.

7. An energy service business method comprising the steps of applying energy-saving measures to at least one of a production facility and utility facility utilizing cold or warm heat energy by installing energy-saving equipment for supplying cold or warm heat energy with the cost thereof paid by an energy service enterprise; measuring data of an energy consumption of the at least one of the production and utility facility before and after taking the energy-saving measures including storing said energy consumption data of the at least one of the production and utility facility before taking energy-saving measures in a database, together with temperature and humidity data of atmosphere as a variable characteristic of the energy consumption of the at least one of the production and utility facility, and measuring the energy consumption data after taking said energy-saving measures by installing the energy-saving equipment for supplying the cold or warm heat energy to the at least one of the production and utility facility, together with said temperature and humidity data; calculating an amount of curtailment of energy costs by comparing the thus measured value with the energy consumption data before taking the energy-saving measures previously stored in said database by comparing said measured energy consumption data having the temperature and humidity data with the stored energy consumption data before taking said energy-saving measures with which the temperature and humidity data agree within a set allowable range; and said energy service enterprise receiving at least a part of said amount of curtailment.

8. An energy service business method according to claim 7, wherein said amount received by the energy service enterprise is determined with reference to the operating hours or the operating rate of the at least one of the production and utility facility.

9. An energy service business method according to claim 7, wherein, when the quantity of energy curtailment is smaller than a predetermined reference value, said energy service enterprise performs maintenance or improvement without compensation of the equipment to which the energy-saving measures are applied so as to satisfy the reference value.

10. An energy service business method according to claim 7, wherein:
when the total amount of the fixed costs such as depreciation and tax and tariffs for a single fiscal year for taking energy-saving measures and the variable costs such as maintenance cost of energy-saving equipment is Q, the annual amount of curtailment of energy costs is P, and $\alpha$ and $\beta$ are positive coefficients (where $\alpha > \beta$), said energy service enterprise receives:
X1% of the curtailment amount of energy costs when $P \geq \alpha Q$;
X2% of the curtailment amount of energy costs when $\beta Q \leq P < \alpha Q$ (where, X1 <X2); and
a predetermined amount when $P < \beta Q$.

11. An energy service business method according to claim 10, wherein said X2 is calculated by the following formula:

$$X2=X1+(\alpha-P/Q)(100-X1)/(\alpha-\beta).$$

12. An energy service business method comprising the steps of drafting energy-saving measures by an energy service enterprise or a related organization thereof; assuring, under at least one set condition of at least one of a production facility and a utility facility utilizing cold or warm heat energy, a quantity of curtailment of energy consumption available when taking energy-saving measures in accordance with the thus drafted measures; measuring data of an energy consumption of the at least one of the production and utility facility before and after taking the energy-saving measures by installing energy-saving equipment for supplying in the cold or warm heat energy in the at least one of the production and utility facility including storing said energy consumption data before taking the energy-saving measures in a database, together with temperature and humidity data of atmosphere as a variable characteristic of the energy consumption data of the at least one of the production and utility facility, and measuring the energy consumption data of the at least one of the production and utility facility after installing of the energy saving equipment, together with the temperature and humidity data; calculating an amount of curtailment of energy costs by comparing the thus measured value with data of an energy consumption of the at the at least one of the production and utility facility before taking the energy-saving measures previously stored in said database by comparing said measured energy consumption of the at least one of the production and utility facility having the temperature and humidity data with the stored energy consumption data before taking said energy-saving measures with which the temperature and humidity data agree within a set allowable range, and periodically confirming the assured quantity of curtailment.

13. An energy service business method according to claim 12, wherein said at least one set condition includes conditions determined as to variable factors having an effect on curtailment of the energy consumption such as the operating rate or operating hours of the at least one of the production and utility facility.

14. An energy service business method according to claim 13, wherein said at least one set condition has an allowable range.

15. An energy service business method according to claim 12, wherein said energy service enterprise receives a compensation in an amount corresponding to the quantity of energy curtailment in excess of an assured value of at least one of a reward for assuring a quantity of energy curtailment and a cost to be appropriated for maintenance and improvement.

16. An energy service business method according to claim 15, wherein the amount received by said energy service enterprise is determined with reference to the operating hours or the operating rate of the at least one of the production and utility facility.

17. An energy service business method according to claim 15, wherein, when the quantity of energy curtailment is under a predetermined reference value, said energy service enterprise performs at least one of maintenance and improvement of an equipment subjected to energy-saving measures without compensation so as to satisfy the reference value.

18. An energy service business system, comprising a database which stores past data about an energy consumption of at least one of a production facility and a utility facility utilizing cold or warm heat energy before taking energy-saving measures;
    measuring means which measures a present data of the energy-consumption of said at least one of said production and utility facility after taking energy-saving measures; and
    calculating means which calculates an energy curtailment quantities of said at least one of said production and utility facility before and after taking the energy-saving measures;
    wherein said past data in said database are stored in a form correlated with temperature and humidity of atmosphere and production quantity as a variable characteristic of the energy-consumption of said at least one of said production facility and said utility facility;
    said measuring means measures said present data of said at least one of said production and utility facility after installation of an energy-saving equipment for supplying said cold or said warm heat energy thereto as said energy-saving measures, together with said temperature, said humidity and said production quantity; and
    said calculating means retrieves said past data with which said temperature, said humidity and said production quantity agree within a set allowable range corresponding to said measured temperature, humidity and production quantity, and calculates the energy curtailment quantities by comparing said retrieved past data and said present data.

19. An energy service business system according to claim 18, wherein said calculating means retrieves a plurality of said past data corresponding to temperature, humidity and a production quantity approximating said measured temperature, humidity and production quantity; performs calculation for estimating past data corresponding to said measured temperature, humidity and production quantity from said plurality of past data; and calculates the energy curtailment quantities by comparing the thus calculated past estimated data and said present data.

* * * * *